US012782983B2

(12) United States Patent
Adachi

(10) Patent No.: US 12,782,983 B2
(45) Date of Patent: Nov. 3, 2026

(54) TEMPERATURE ADJUSTMENT DEVICE THAT CONTROLS TEMPERATURE GRADIENT IN PROCESS UNTIL REACHING TARGET TEMPERATURE

(71) Applicant: SMC CORPORATION, Chiyoda-ku (JP)

(72) Inventor: Makoto Adachi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 256 days.

(21) Appl. No.: 18/555,298

(22) PCT Filed: Mar. 24, 2022

(86) PCT No.: PCT/JP2022/013820

§ 371 (c)(1),
(2) Date: Oct. 13, 2023

(87) PCT Pub. No.: WO2022/224690

PCT Pub. Date: Oct. 27, 2022

(65) Prior Publication Data

US 2024/0192711 A1 Jun. 13, 2024

(30) Foreign Application Priority Data

Apr. 21, 2021 (JP) ................................ 2021-071970

(51) Int. Cl.
*F28F 27/00* (2006.01)
*G05D 23/19* (2006.01)

(52) U.S. Cl.
CPC ............. *G05D 23/19* (2013.01); *F28F 27/00* (2013.01)

(58) Field of Classification Search
CPC .......... G05D 23/19; F28F 27/00; F25D 17/02; F25D 31/003; F25D 31/002;
(Continued)

(56) References Cited

U.S. PATENT DOCUMENTS 2,555,012 A * 5/1951 Spofford .................. F24F 11/30
236/1 C
3,888,303 A * 6/1975 Skala ...................... A47J 27/17
165/300
(Continued)

FOREIGN PATENT DOCUMENTS

JP 2691001 B2 12/1997
JP 2816054 B2 10/1998
(Continued)

OTHER PUBLICATIONS

Japanese Office Action issued Dec. 17, 2024 in Japanese Patent Application No. 2021-071970 (with English translation), 12 pages.
(Continued)

*Primary Examiner* — Travis Ruby
(74) *Attorney, Agent, or Firm* — Oblon, McClelland, Maier & Neustadt, L.L.P.

(57) ABSTRACT

A temperature adjustment device is provided to gradually change the temperature of a load to a target temperature while adjusting the temperature of the load to the target temperature in the middle of temperature adjustment. A time-dependent set temperature of the load is calculated from a target temperature gradient at each elapsed time of a plurality of timings within a target reach time period, and the time-dependent set temperature is compared with a time-dependent measured temperature inputted from a measurement input unit. A control output unit controls a heating unit and a cooling unit based on a result of comparison between the time-dependent set temperature and the time-dependent measured temperature.

7 Claims, 4 Drawing Sheets

(58) Field of Classification Search
CPC ...... G05B 2219/49057; H01J 37/32715; H01J 37/32724; B23Q 11/14; B23Q 11/141; B23Q 11/143; F28D 2021/0077
See application file for complete search history.

(56) References Cited

U.S. PATENT DOCUMENTS

| | | | | |
|---|---|---|---|---|
| 4,060,997 | A * | 12/1977 | Shultz | G05D 23/1931 62/185 |
| 4,621,678 | A * | 11/1986 | Hahn | F28F 9/22 165/263 |
| 5,198,752 | A * | 3/1993 | Miyata | G01R 31/2875 324/750.08 |
| 5,278,495 | A * | 1/1994 | Beaton | G01R 31/2817 324/763.01 |
| 5,914,885 | A | 6/1999 | Kitamura | |
| 6,003,595 | A * | 12/1999 | Watanabe | H01L 21/67057 165/300 |
| 6,233,955 | B1 * | 5/2001 | Egara | F25B 41/20 62/185 |
| 6,239,602 | B1 * | 5/2001 | Nakagomi | G01R 31/2874 165/80.4 |
| 6,362,944 | B1 * | 3/2002 | Tustaniwskyj | G05D 23/1919 361/103 |
| 6,386,280 | B1 * | 5/2002 | Egara | F25B 41/34 62/99 |
| 6,397,943 | B1 * | 6/2002 | Egara | F25D 31/003 165/263 |
| 6,412,551 | B1 * | 7/2002 | Tustaniwskyj | G05D 23/1393 165/300 |
| 7,073,342 | B2 * | 7/2006 | Sakaguchi | G01K 17/00 62/185 |
| 7,637,315 | B2 | 12/2009 | Ichinose et al. | |
| 8,025,097 | B2 * | 9/2011 | Di Stefano | G05D 23/1393 361/677 |
| 2002/0020179 | A1 * | 2/2002 | Winkler | G05D 23/1393 62/177 |
| 2005/0072172 | A1 * | 4/2005 | Sakaguchi | G01K 17/00 62/185 |
| 2007/0074863 | A1 * | 4/2007 | Ichinose | G05D 23/192 165/247 |
| 2007/0074864 | A1 * | 4/2007 | Ichinose | F25D 17/02 165/247 |
| 2007/0074865 | A1 * | 4/2007 | Ichinose | G05D 23/1919 165/247 |
| 2008/0223555 | A1 * | 9/2008 | Di Stefano | F28F 27/00 257/E23.098 |
| 2008/0289811 | A1 | 11/2008 | Kariya | |
| 2008/0314564 | A1 | 12/2008 | Nagaseki et al. | |
| 2012/0255352 | A1 * | 10/2012 | Sakaguchi | G05D 9/12 73/290 R |
| 2015/0007599 | A1 * | 1/2015 | Sugiyama | F25B 49/02 62/89 |
| 2016/0146519 | A1 * | 5/2016 | Ito | F28D 1/0435 62/498 |
| 2016/0234969 | A1 * | 8/2016 | Shimizu | H05K 7/20281 |
| 2020/0318861 | A1 | 10/2020 | Kikuchi et al. | |
| 2024/0200842 | A1 * | 6/2024 | Adachi | G05D 23/1917 |

FOREIGN PATENT DOCUMENTS

| | | | |
|---|---|---|---|
| JP | 11-294927 | A | 10/1999 |
| JP | 2007-101006 | A | 4/2007 |
| JP | 2008-292026 | A | 12/2008 |
| JP | 2019-191841 | A | 10/2019 |

OTHER PUBLICATIONS

Japanese Notice of Decision for Refusal issued Mar. 24, 2025 in Japanese Patent Application No. 2021-071970 with English translation, 12 pgs.
Extended European Search Report issued Jan. 24, 2025, in corresponding European Patent Application No. 22791467.8, 8 pages.
International Search Report issued May 17, 2022 in PCT/JP2022/013820 filed on Mar. 24, 2022, 2 pages.

* cited by examiner

TEMPERATURE ADJUSTMENT DEVICE THAT CONTROLS TEMPERATURE GRADIENT IN PROCESS UNTIL REACHING TARGET TEMPERATURE

TECHNICAL FIELD

The present invention relates to a temperature adjustment device that supplies temperature-controlled circulating liquid to a load to adjust the temperature of the load to a target temperature.

BACKGROUND ART

As disclosed in, for example, PTL 1, a generally known temperature adjustment device supplies temperature-controlled circulating liquid to a load to adjust the temperature of the load to a predetermined target temperature. A related-art temperature adjustment device of this type typically includes a circulating liquid circuit through which the circulating liquid is circulated between the device and a load and a temperature controller that controls the temperature of the circulating liquid to adjust the temperature of the load to the target temperature.

Nowadays, such temperature adjustment devices are used in different fields. For example, a beer manufacturing process may involve cooling raw material liquid in a tank to a predetermined target temperature through such a temperature adjustment device. In this case, there is a demand to gradually cool the raw material liquid in the tank to the target temperature while adjusting the temperature of the raw material liquid.

In the related-art temperature adjustment device, however, the temperature controller controls the temperature of the circulating liquid so that the temperature of the load can be adjusted to the target temperature as quickly as possible. It is therefore difficult to gradually change the temperature of the load (i.e., the raw material liquid for beer) to the target temperature while adjusting the temperature of the load as described above. Achieving such load temperature adjustment inevitably involves a complicated operation of temperature adjustment, for example, changing the temperature of a load to a final target temperature in a stepwise manner while resetting a set temperature in a temperature adjustment device at predetermined time intervals, or several times.

CITATION LIST

Patent Literature

PTL 1: Japanese Unexamined Patent Application Publication No. 2007-101006

SUMMARY OF INVENTION

Technical Problem

A technical problem of the present invention is to provide a temperature adjustment device capable of gradually changing the temperature of a load to a target temperature while adjusting the temperature of the load to the target temperature in the middle of temperature adjustment.

Solution to Problem

To solve the technical problem, the present invention provides a temperature adjustment device to adjust a temperature of a load to a target temperature. The temperature adjustment device includes a circulating liquid circuit configured to cyclically deliver, to the load, circulating liquid returned from the load after heat exchange with the load, a heating unit located in the circulating liquid circuit and configured to heat the circulating liquid in the circulating liquid circuit, a cooling unit located in the circulating liquid circuit and configured to cool the circulating liquid in the circulating liquid circuit, and a controller configured to control an output of the heating unit and an output of the cooling unit. The controller includes a measurement input unit to which a measured temperature of the load is inputted, a setting input unit to which the target temperature, serving as a target set temperature, and a target reach time period for the temperature of the load to reach the target set temperature from start of temperature adjustment are inputted, an arithmetic unit configured to determine, based on an initial set temperature at the start of temperature adjustment as well as the target set temperature and the target reach time period inputted from the setting input unit, a target temperature gradient to the target set temperature, and a control output unit configured to control the output of the heating unit and the output of the cooling unit such that the measured temperature of the load changes along the target temperature gradient determined by the arithmetic unit.

In addition, to solve the technical problem, the present invention provides a temperature adjustment device to adjust a temperature of a load to a target temperature. The temperature adjustment device includes a circulating liquid circuit configured to cyclically deliver, to the load, circulating liquid returned from the load after heat exchange with the load, a heating unit located in the circulating liquid circuit and configured to heat the circulating liquid in the circulating liquid circuit, a cooling unit located in the circulating liquid circuit and configured to cool the circulating liquid in the circulating liquid circuit, and a controller configured to control an output of the heating unit and an output of the cooling unit. The controller includes a measurement input unit to which a measured temperature of the circulating liquid heated and cooled or to be heated and cooled is inputted, a setting input unit to which a target set temperature of the circulating liquid that corresponds to the target temperature and a target reach time period for the temperature of the circulating liquid to reach the target set temperature from start of temperature adjustment are inputted, an arithmetic unit configured to calculate, based on an initial set temperature at the start of temperature adjustment as well as the target set temperature and the target reach time period inputted from the setting input unit, a target temperature gradient to the target set temperature, and a control output unit configured to control the output of the heating unit and the output of the cooling unit such that the measured temperature of the circulating liquid changes along the target temperature gradient determined by the arithmetic unit.

In the temperature adjustment device, preferably, the circulating liquid circuit includes a return passage through which the circulating liquid returned from the load is received, a discharge passage through which the circulating liquid subjected to temperature adjustment by the heating unit and the cooling unit is delivered to the load, a tank unit connected to the return passage and the discharge passage and configured to store the circulating liquid, and a circulation pump configured to deliver the circulating liquid in the tank unit to the discharge passage.

Preferably, the cooling unit includes a heat-dissipating water circuit through which heat-dissipating water flows and a heat exchanger configured to exchange heat between the heat-dissipating water flowing through the heat-dissipating water circuit and the circulating liquid flowing through the circulating liquid circuit, the heating unit includes a heater, the heat-dissipating water circuit includes a flow control valve configured to adjust a flow rate of the heat-dissipating water flowing through the heat-dissipating water circuit, and the control output unit controls the output of the heating unit and the output of the cooling unit by controlling the heater and the flow control valve.

In the temperature adjustment device, the arithmetic unit may calculate a time-dependent set temperature of the load from the target temperature gradient at each of a plurality of timings within the target reach time period and compare the time-dependent set temperature with the measured temperature of the load inputted from the measurement input unit, and the control output unit may control, based on a result of comparison between the time-dependent set temperature and the measured temperature, the output of the heating unit and the output of the cooling unit. Or alternatively, the arithmetic unit may calculate a time-dependent set temperature of the circulating liquid from the target temperature gradient at each of a plurality of timings within the target reach time period and compare the time-dependent set temperature with the measured temperature of the circulating liquid inputted from the measurement input unit, and the control output unit may control, based on a result of comparison between the time-dependent set temperature and the measured temperature, the output of the heating unit and the output of the cooling unit.

Advantageous Effects of Invention

According to the present invention, there can be provided a temperature adjustment device capable of gradually changing the temperature of a load to a target temperature while adjusting the temperature of the load to the target temperature during a process of temperature adjustment.

DESCRIPTION OF EMBODIMENTS

FIGS. 1 to 4 illustrate a temperature adjustment device according to a first embodiment of the present invention. The temperature adjustment device, 1, is suitable particularly to gradually change the temperature of a temperature adjustment target (load W, such as raw material liquid for beer) to a target temperature while performing temperature adjustment (i.e., temperature control).

Figure 1:
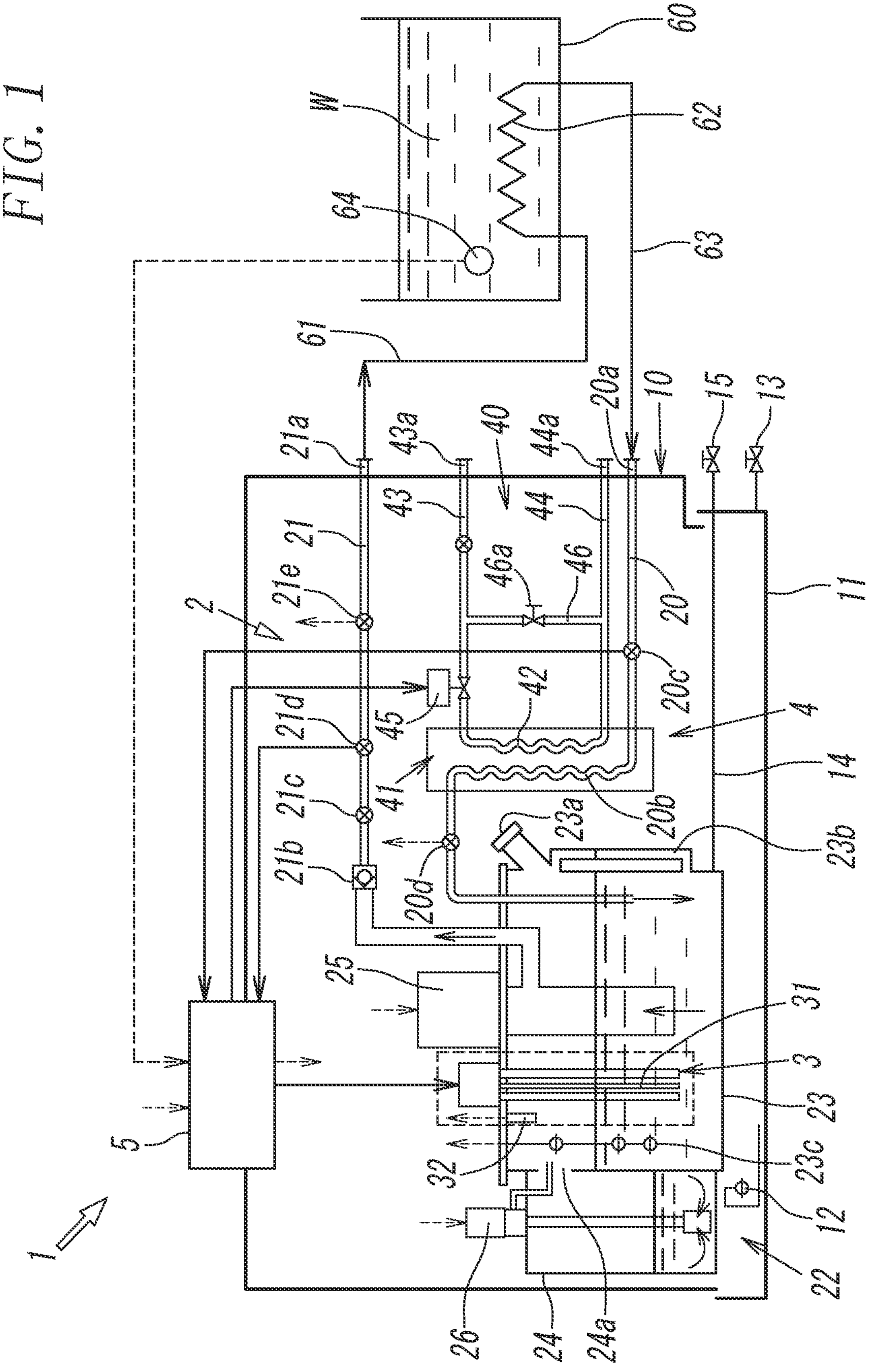
FIG. 1 is a schematic circuit diagram of a temperature adjustment device according to an embodiment of the present invention.

As illustrated in FIG. 1, the temperature adjustment device 1 includes a housing 10, serving as an outer casing of the device 1. The temperature adjustment device 1 includes, in the housing 10, a circulating liquid circuit 2 configured to receive circulating liquid returned from a load W after heat exchange with the load W and again cyclically deliver the received circulating liquid to the load W, a heating unit 3 located in the circulating liquid circuit 2 and configured to heat the circulating liquid in the circulating liquid circuit 2, a cooling unit 4 located in the circulating liquid circuit 2 and configured to cool the circulating liquid in the circulating liquid circuit 2, and a controller 5 configured to control an output of the heating unit 3 and an output of the cooling unit 4.

The circulating liquid circuit 2 includes a return passage 20 through which the circulating liquid returned from the load W after heat exchange with the load W is received, a discharge passage 21 through which the circulating liquid subjected to temperature adjustment by the heating unit 3 and the cooling unit 4 is delivered to the load W, a tank unit 22 disposed between the return passage 20 and the discharge passage 21 to store the circulating liquid, and a circulation pump 25 to deliver the circulating liquid stored in the tank unit 22 to the discharge passage 21.

The tank unit 22 includes a main tank 23, which is connected to the return passage 20 and the discharge passage 21, and a subtank 24 connected to an upper portion of the main tank 23 through a communication port 24*a*. The main tank 23 has an inlet 23*a*, through which the circulating liquid is fed to the tank unit 22, and a level gauge 23*b*, which enables the amount of circulating liquid stored in the main tank 23 to be visible to the outside of the housing 10.

The main tank 23 includes the heating unit 3, the circulation pump 25, and a level switch 23*c*, which detects the level of the circulating liquid stored in the tank 23. For the circulation pump, an immersion type inverter pump is preferably used. The heating unit 3, the circulation pump 25, and the level switch 23*c* are electrically connected to the controller 5. Furthermore, the heating unit 3 includes a heater 31 and a thermal fuse 32, which are electrically connected to the controller 5. The heater and the thermal fuse are electrically connected to the controller 5.

Such a configuration allows the heater 31 to heat the circulating liquid in the main tank 23 so as to adjust the temperature of the circulating liquid, and allows adjustment of the flow rate of the circulating liquid delivered to the discharge passage 21. The thermal fuse 32 allows the temperature adjustment device 1 to be, for example, turned off in response to determination that the device is in a dangerous condition, for example, when the temperature of air in the main tank 23 is higher than a predetermined temperature. The bottom of the tank unit 22 is connected to one end of a drain pipe 14. The other end of the drain pipe 14 has a drain port 15, which can be opened or closed. Thus, the circulating liquid in the tank unit 22 can be discharged to the outside, for example, when the inside of the tank unit 22 is cleaned.

The subtank 24 includes an immersion type internal pump 26 to draw the circulating liquid stored in the subtank to the main tank 23. For the internal pump 26, an inverter pump is preferably used. The internal pump 26 is electrically connected to the controller 5. In such a configuration, an excess of circulating liquid that exceeds a maximum capacity of the main tank 23 can be discharged to the subtank 24 through the communication port 24*a* and be stored in the subtank 24. Furthermore, when the level switch 23*c* detects a reduction in liquid level in the main tank 23, the circulating liquid in the subtank 24 can be drawn by the internal pump 26 to refill the main tank 23.

The return passage 20 has, at its one end, a circulating liquid return port 20*a* formed in the housing 10. The other end of the return passage 20 is connected to the main tank 23. Furthermore, the return passage 20 includes a first heat exchange passage 20*b*, through which the circulating liquid flowing therethrough exchanges heat with the cooling unit 4, located between the one end and the other end. Such a configuration allows the circulating liquid received through the return port 20*a* to be cooled in the first heat exchange passage 20*b* by the cooling unit 4 and then be returned to the main tank 23.

In the return passage 20, a first temperature sensor 20*c*, which detects the temperature of the circulating liquid received through the circulating liquid return port 20*a*, is located between the return port 20*a* and the first heat exchange passage 20*b*, and a second temperature sensor 20*d*, which detects the temperature of the circulating liquid cooled by the cooling unit, is located between the first heat exchange passage 20*b* and the main tank 23. Both the first temperature sensor 20*c* and the second temperature sensor 20*d* are electrically connected to the controller 5.

Therefore, as will be described later, the first temperature sensor 20*c* can be used to control the outputs of the heating unit 3 and the cooling unit 4 through the controller 5 based on a target set temperature Ta previously set by a user. In addition, for example, both the sensors 20*c* and 20*d* can be used to detect an abnormal temperature of the circulating liquid and stop the temperature adjustment device 1 in response to the detection and to control the output of the cooling unit 4 based on the difference between the temperatures of the circulating liquid detected by the sensors 20*c* and 20*d*.

The discharge passage 21 has, at its one end, a circulating liquid discharge port 21*a* formed in the housing 10. The other end of the discharge passage 21 is connected to the circulation pump 25. Such a configuration allows the circulating liquid cooled by the cooling unit 4 in the return passage 20 and heated by the heating unit 3 (heater 31) in the main tank 23 to be supplied to the circulating liquid discharge port 21*a* through the discharge passage 21.

The discharge passage 21 has a check valve 21*b*, which prevents backflow of the circulating liquid in a direction from the circulating liquid discharge port 21*a* to the circulation pump 25. In the discharge passage 21, a pressure sensor 21*c*, a third temperature sensor 21*d*, and a flow meter sensor 21*e* are sequentially arranged in that order from an upstream side between the check valve 21*b* and the discharge port 21*a*. These sensors 21*c*, 21*d*, and 21*e* are also electrically connected to the controller 5.

In such a configuration, for the pressure sensor 21*c* and the flow meter sensor 21*e*, for example, the number of revolutions of the circulation pump 25 can be controlled based on the pressure and flow rate of the circulating liquid detected by these sensors. For example, an abnormal pressure of the circulating liquid and an abnormal flow rate thereof can be detected, and the temperature adjustment device 1 can be stopped in response to the detection. Furthermore, as will be described later, the third temperature sensor 21*d* can be used to control the outputs of the heating unit 3 and the cooling unit 4 through the controller 5 based on the target set temperature Ta previously set by the user. In addition, the third temperature sensor 21*d* can also be used, for example, to detect an abnormal temperature of the circulating liquid and stop the temperature adjustment device 1 in response to the detection and to control the outputs of the heating unit 3 and the cooling unit 4 based on the difference between the temperature of the circulating liquid detected by the third temperature sensor 21*d* and that detected by the first temperature sensor 20*c* or the second temperature sensor 20*d*.

In the present embodiment, the cooling unit 4 includes a heat-dissipating water circuit 40, through which heat-dissipating water flows, and a heat exchanger 41, which exchanges heat between the heat-dissipating water flowing through the heat-dissipating water circuit 40 and the circulating liquid flowing through the return passage 20. Specifically, the heat-dissipating water circuit 40 includes a second heat exchange passage 42 located in the heat exchanger 41, a heat-dissipating water introduction path 43, which is connected to one end of the second heat exchange passage 42 and through which the heat-dissipating water is introduced into the heat exchanger 41, and a heat-dissipating water discharge path 44, which is connected to the other end of the second heat exchange passage 42 and through which the heat-dissipating water subjected to heat exchange with the circulating liquid in the heat exchanger 41 is discharged from the heat exchanger 41.

Furthermore, the heat-dissipating water circuit 40 has a flow control valve 45 to adjust the flow rate of the heat-dissipating water to be supplied to the second heat exchange passage 42. The flow control valve 45 is electrically connected to the controller 5. The controller 5 controls the flow control valve 45, thus controlling the flow rate of the heat-dissipating water to be supplied to the second heat exchange passage 42, or the output of the cooling unit 4.

More specifically, the heat-dissipating water introduction path 43 is connected at its one end to an upstream end of the second heat exchange passage 42 and has, at the other end, a heat-dissipating water supply port 43*a* formed in the housing 10. The heat-dissipating water introduction path 43 has the flow control valve 45 between the supply port 43*a* and the second heat exchange passage 42. The heat-dissipating water discharge path 44 is connected at its one end to an outlet end of the second heat exchange passage 42 and has, at the other end, a heat-dissipating water discharge port 44*a* formed in the housing 10.

For the flow control valve 45, for example, a proportional valve or a solenoid valve can be used. For the proportional valve, controlling the opening degree of the valve can control the flow rate of the heat-dissipating water to be supplied to the second heat exchange passage 42, or the output of the cooling unit 4. For the solenoid valve, controlling the ratio of open time to closed time of the valve can control the flow rate of the heat-dissipating water to be supplied to the second heat exchange passage 42, or the output of the cooling unit 4.

In the heat-dissipating water circuit 40, a position upstream of the flow control valve 45 (adjacent to the heat-dissipating water supply port 43*a*) in the heat-dissipating water introduction path 43 is connected to the heat-dissipating water discharge path 44 by a bypass path 46. The bypass path 46 has a gate valve 46*a*. The gate valve 46*a* can be closed or opened as necessary. For example, the gate valve 46*a* can be opened to reduce the temperature of the heat-dissipating water heated through the second heat exchange passage 42 and then discharge the water or to reduce a phenomenon called water hammer in the flow control valve 45.

The bottom of the housing 10 has a drain pan 11 to receive leaked circulating liquid or heat-dissipating water. The drain pan 11 has a float type leakage sensor 12 electrically connected to the controller 5 and a drain port 13, which can be closed or opened to discharge liquid accumulated on the drain pan 11 to the outside. In such a configuration, for example, when the leakage sensor 12 detects leakage of a large amount of circulating liquid or heat-dissipating water in the device 1, the controller 5 can provide notification of the leakage, or alternatively, the device 1 can be turned off.

Figure 2:
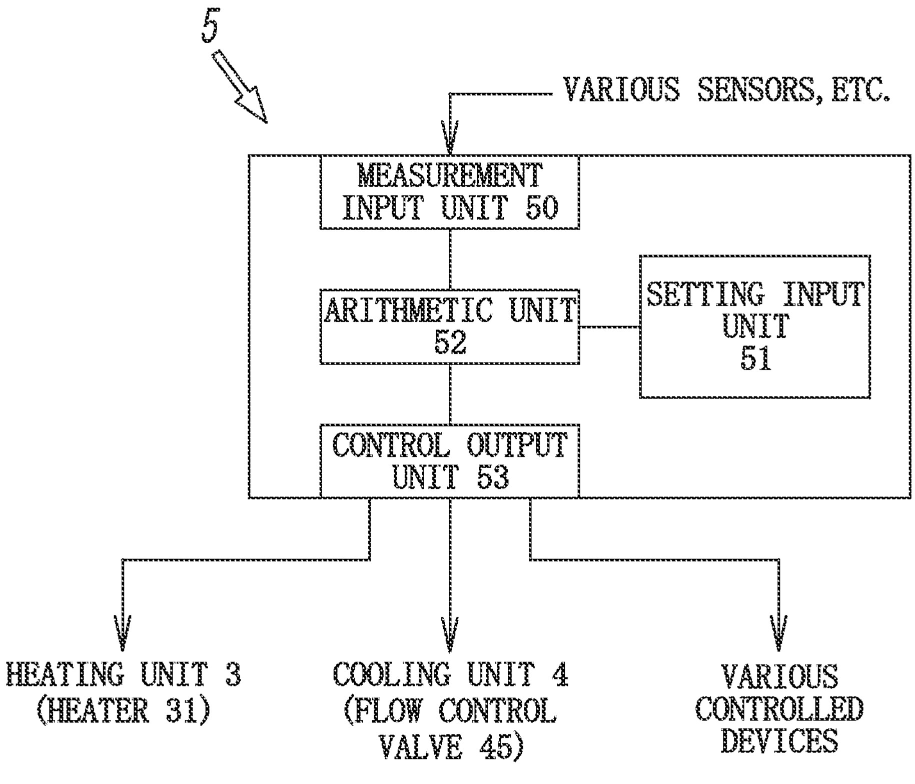
FIG. 2 is a block diagram illustrating a controller in FIG. 1.

As illustrated in FIG. 2, the controller 5 includes a measurement input unit 50, to which results of detection by various sensors, etc. including the temperature sensors are inputted, a setting input unit 51, to which various set values including the target set temperature Ta, which will be described later, are inputted, an arithmetic unit 52, which performs a predetermined arithmetic based on various pieces of data inputted from the measurement input unit 50 and the setting input unit 51, and a control output unit 53, which outputs control signals to various controlled devices including the heater 31 of the heating unit 3 and the flow control valve 45 for the cooling unit 4 on the basis of a result of arithmetic by the arithmetic unit 52.

How to use the temperature adjustment device 1 will now be described. In the following description, it is assumed that the temperature adjustment device 1 is used to adjust a liquid load (liquid, such as raw material liquid for beer in a tank 60) W to a target temperature.

To connect the temperature adjustment device 1 to the load W, as illustrated in FIG. 1, one end of a supply pipe 61 to supply the circulating liquid to the load W is connected to the circulating liquid discharge port 21*a* of the temperature adjustment device 1, and the other end thereof is connected to an inlet of a heat exchange member (specifically, a heat exchange pipe immersed in the liquid load W in the tank 60) 62 for heat exchange with the load W. One end of a return pipe 63 to return the circulating liquid subjected to heat exchange with the load W to the temperature adjustment device 1 is connected to an outlet of the heat exchange member 62, and the other end of the return pipe 63 is connected to the circulating liquid return port 20*a* of the temperature adjustment device 1. Furthermore, a load temperature sensor 64 disposed in contact with the load W (specifically, immersed in the liquid load W in the tank 60) is electrically connected to the measurement input unit 50 of the controller 5 as necessary.

How to control the temperature adjustment device 1 in adjusting the temperature of the load W to the target temperature will now be described with reference to FIGS. 2 to 4. A case where the load W is adjusted to the target temperature based on the temperature of the load W measured by the load temperature sensor 64 and a case where the temperature of the load W is adjusted to the target temperature based on the temperature of the circulating liquid measured by the first temperature sensor 20*c* or the third temperature sensor 21*d* will be described. The latter case is on the assumption that the temperature of the load W substantially follows the adjusted temperature of the circulating liquid. In the following description, for example, it is assumed that the load W is adjusted to a target temperature higher than the current temperature of the load W, as illustrated in FIG. 4.

<Using Load Temperature Sensor 64>

Figure 3:
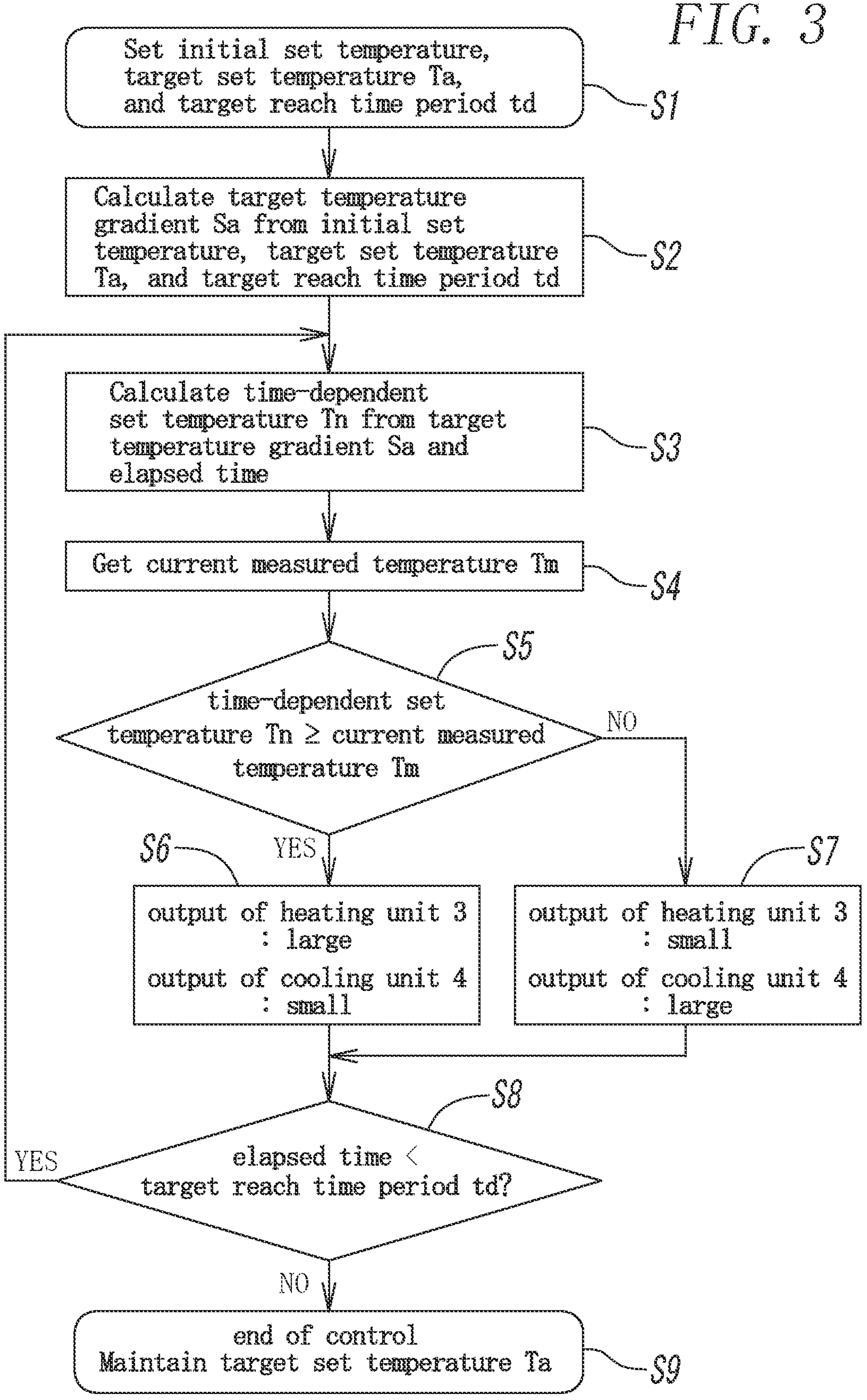
FIG. 3 is a flowchart of control by the controller in FIG. 1.
Figure 4:
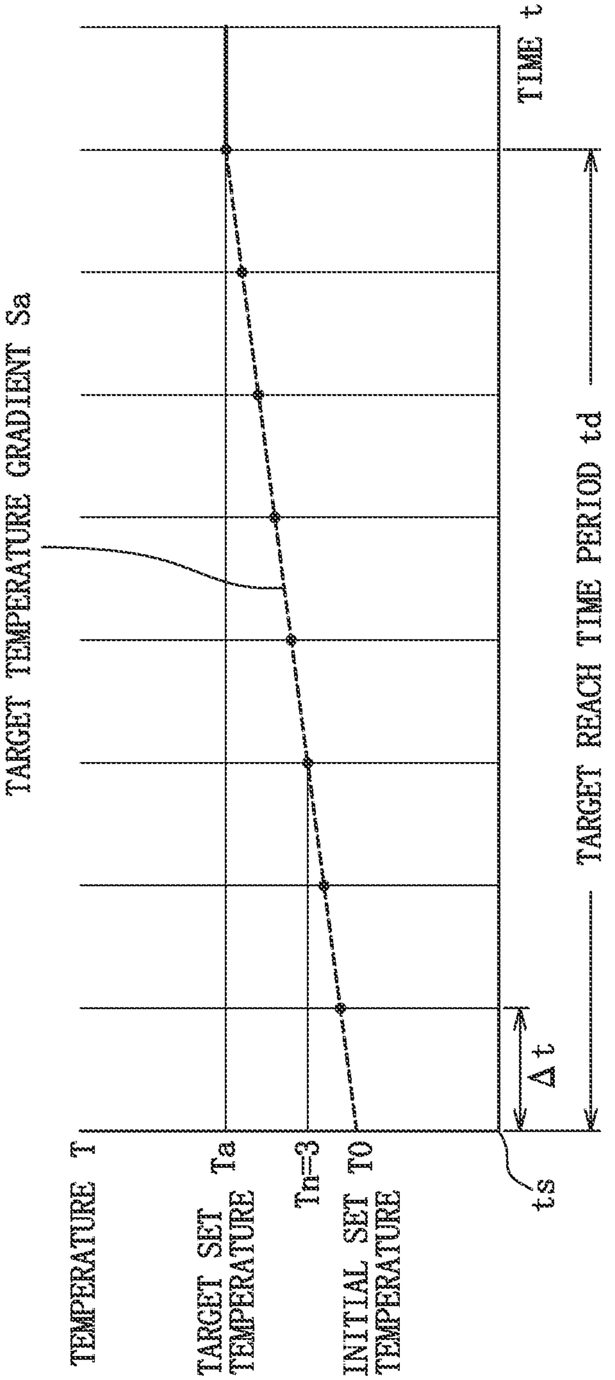
FIG. 4 is a graph illustrating an exemplary change over time in time-dependent set temperature for a target reach time period in the temperature adjustment device of FIG. 1.

With reference to a flowchart of FIG. 3, the target set temperature Ta as a desired target temperature of the load W, a target reach time period td as a desired time period for the temperature of the load W to reach the target set temperature Ta, and an initial set temperature T0 as a set temperature at the start ts of temperature adjustment are inputted to the setting input unit 51 of the controller 5 (S1). The initial set temperature T0 set in advance may be used, and inputting the initial set temperature T0 may be omitted. The arithmetic unit 52 of the controller 5 calculates, based on the initial set temperature T0, the target set temperature Ta, and the target reach time period td, a target gradient (target temperature gradient Sa) of a change in temperature for the target reach time period td from the start of temperature adjustment (S2).

After the start of temperature adjustment of the load W to the target set temperature Ta, the arithmetic unit 52 calculates, based on the initial set temperature T0, the target temperature gradient Sa, and elapsed time (Δt×n:n=1, 2, 3 . . . ) from the start ts of temperature adjustment, a target set temperature (time-dependent set temperature Tn:n=1, 2, 3 . . . ), serving as a target at the current elapsed time, at predetermined time intervals Δt (S3). The time interval Δt may be inputted from the setting input unit 51 in S1 described above. The time interval Δt is not necessarily be constant, and can be previously set to vary depending on elapsed time. In other words, the arithmetic unit 52 calculates the time-dependent set temperature Tn of the load W from the target temperature gradient Sa at each (elapsed time) of a plurality of predetermined timings within the target reach time period td.

The load temperature sensor 64 inputs a measured temperature (time-dependent measured temperature) Tm of the load W at the current elapsed time (Δt×n) to the measurement input unit 50 of the controller 5 (S4). The arithmetic unit 52 compares the time-dependent set temperature Tn with the time-dependent measured temperature Tm (S5) and transmits the result of comparison to the control output unit 53 of the controller 5.

If the time-dependent set temperature Tn is higher than or equal to the time-dependent measured temperature Tm, the control output unit 53 performs control so that the output of the heating unit 3 defined by the output of the heater 31 is greater than the output of the cooling unit 4 defined by the flow rate of the heat-dissipating water through the flow control valve 45 (S6). If the time-dependent set temperature Tn is lower than the time-dependent measured temperature Tm, the control output unit 53 performs control so that the output of the cooling unit 4 is greater than the output of the heating unit 3 (S7). The difference between the outputs of the heating unit 3 and the cooling unit 4 in S6 and S7 described above can be determined based on, for example, a temperature difference between the time-dependent set temperature Tn and the time-dependent measured temperature Tm.

Steps S3 to S7 described above are repeated until the elapsed time (Δt×n) from the start ts of temperature adjustment reaches the target reach time period td (S8). If the elapsed time (Δt×n) has reached the target reach time period td, temperature control based on the target temperature gradient Sa is terminated. At the termination, the control is shifted to control for maintaining the temperature of the load W at the target set temperature Ta (S9). The above-described control method allows the temperature of the load to change to the target set temperature Ta along the target temperature gradient Sa. In step S9 described above, the temperature of the load W does not necessarily have to be maintained at the target set temperature Ta. The load W may be continuously subjected to temperature control for a previously set second target set temperature by using or without using the control based on the flowchart.

Conversely, assuming that the load W is adjusted to a temperature lower than the current target temperature, if the time-dependent set temperature Tn is lower than or equal to the time-dependent measured temperature Tm, control is performed so that the output of the cooling unit 4 is greater than the output of the heating unit 3 (S7). If the time-dependent set temperature Tn is higher than the time-dependent measured temperature Tm, control is performed so that the output of the heating unit 3 is greater than the output of the cooling unit 4 (S6).

<Using First Temperature Sensor 20*c* or Third Temperature Sensor 21*d* in Circulating Liquid Circuit 2>

Since the temperature of the load W substantially follows the adjusted temperature of the circulating liquid as described above, the load W can also be adjusted to a target temperature based on the flowchart of FIG. 3 in this case. The following description will focus on differences from the above-described case using the load temperature sensor 64, and common description will be omitted.

In this case, in step S1, a temperature of the circulating liquid that corresponds to a desired target temperature of the load W is inputted as a target set temperature Ta to the setting input unit 51. At the same time, the initial set temperature T0 and the target reach time period td are inputted to the setting input unit 51. The initial set temperature T0 set in advance may be continuously used as described above. In step S2, the target temperature gradient Sa is calculated based on the initial set temperature T0, the target set temperature Ta, and the target reach time period td.

In step S3, after the start of temperature adjustment of the circulating liquid to the target set temperature Ta, the time-dependent set temperature Tn is calculated based on the initial set temperature T0, the target temperature gradient Sa, and the elapsed time (Δt×n) from the start ts of temperature adjustment at the predetermined time intervals Δt. In step S4, the time-dependent measured temperature Tm of the circulating liquid at the current elapsed time (Δt×n) is inputted from the first temperature sensor 20*c* or the third temperature sensor 21*d* in the circulating liquid circuit 2 to the measurement input unit 50. Then, in step S5, the time-dependent set temperature Tn is compared with the time-dependent measured temperature Tm.

If the time-dependent set temperature Tn is higher than or equal to the time-dependent measured temperature Tm, both the output of the heating unit 3 and the output of the cooling unit 4 are controlled in step S6 so that the output of the heating unit 3 is greater than the output of the cooling unit 4. If the time-dependent set temperature Tn is lower than the time-dependent measured temperature Tm, the outputs of the heating unit 3 and the cooling unit 4 are controlled in step S7 so that the output of the cooling unit 4 is greater than the output of the heating unit 3. The difference between the outputs of the heating unit 3 and the cooling unit 4 can be determined based, for example, not only on the temperature difference between the time-dependent set temperature Tn and the time-dependent measured temperature Tm, but also on the difference between a temperature measured by the first temperature sensor 20*c* and a temperature measured by the third temperature sensor 21*d*.

Steps S3 to S7 described above are repeated until the elapsed time (Δt×n) from the start ts of temperature adjustment reaches the target reach time period td in step S8. Then, the above-described temperature control is terminated in step S9. At the termination, the control is shifted to control for maintaining the temperature of the circulating liquid at the target set temperature Ta.

As described above, the temperature adjustment device 1 can gradually change the temperature of the load W to a target temperature, which the user desires, while performing temperature control during a process of adjusting the temperature of the load W to the target temperature.

REFERENCE SIGNS LIST

1 temperature adjustment device
2 circulating liquid circuit
20 return passage
20*b* first heat exchange passage
20*c* first temperature sensor
20*d* second temperature sensor
21 discharge passage
21*d* third temperature sensor
22 tank unit
23 main tank
25 circulation pump
3 heating unit
31 heater
4 cooling unit
40 heat-dissipating water circuit
41 heat exchanger
42 second heat exchange passage
43 heat-dissipating water introduction path
44 heat-dissipating water discharge path
45 flow control valve
5 controller
50 measurement input unit
51 setting input unit
52 arithmetic unit
53 control output unit
64 load temperature sensor
W load
Ta target set temperature
td target reach time period
ts start of temperature adjustment
T0 initial set temperature
Δt measurement time interval
Sa target temperature gradient
Tn time-dependent set temperature
Tm time-dependent measured temperature

The invention claimed is:

1. A temperature adjustment device to adjust a temperature of a load to a target temperature, the temperature adjustment device is formed by locating, inside of a housing and comprising:

a circulating liquid circuit configured to cyclically deliver, to the load, circulating liquid returned from the load after heat exchange with the load;

a heater located in the circulating liquid circuit and configured to heat the circulating liquid in the circulating liquid circuit;

a heat exchanger connected to a heat-dissipating water circuit, the heat exchanger located in the circulating liquid circuit and configured to cool the circulating liquid in the circulating liquid circuit; and a controller configured to control an output of the heater and an output of the heat exchanger, the controller configured to input a measured temperature of the load, input the target temperature, serving as a target set temperature, and a target reach time period for the temperature of the load to reach the target set temperature from start of temperature adjustment, determine, based on an initial set temperature at the start of temperature adjustment as well as the target set temperature and the target reach time period, a target temperature gradient to the target set temperature, and control the output of the heater and the output of the heat exchanger such that the measured temperature of the load changes along the target temperature gradient, wherein the circulating liquid circuit includes a return passage through which the circulating liquid returned from the load is received, a discharge passage through which the circulating liquid subjected to temperature adjustment by the heater and the heat exchanger is delivered to the load, a tank unit connected to the return passage and the discharge passage and configured to store the circulating liquid, and a circulation pump configured to deliver the circulating liquid in the tank unit to the discharge passage, the return passage is opened in the housing, and connects between a circulating liquid return port for connecting a return passage for returning the circulating liquid after heat exchange with the load to the temperature adjustment device, and the tank unit, and the heat exchanger is located on the return passage, the heater is located on the tank unit, a second temperature sensor for measuring a temperature of the circulating liquid cooled in the heat exchanger is located on a downstream side of the heat exchanger in the return passage, and the controller is configured to input the temperature of the circulating liquid measured at the second temperature sensor to detect an abnormal temperature of the circulating liquid based on the measured temperature of the circulating liquid.

2. The temperature adjustment device according to claim 1, wherein the heat exchanger is configured to exchange heat between a heat-dissipating water flowing through the heat-dissipating water circuit and a circulating liquid flowing through the circulating liquid circuit, the heat-dissipating water circuit includes a flow control valve configured to adjust a flow rate of the heat-dissipating water flowing through the heat-dissipating water circuit, and the controller controls the output of the heater and the output of the heat exchanger by controlling the heater and the flow control valve.

3. The temperature adjustment device according to claim 1, wherein the controller calculates a time-dependent set temperature of the load from the target temperature gradient at each of a plurality of timings within the target reach time period and compares the time-dependent set temperature with the measured temperature of the load, and the controller controls, based on a result of comparison between the time-dependent set temperature and the measured temperature, the output of the heater and the output of the heat exchanger.

4. The temperature adjustment device according to claim 1, wherein the discharge passage is opened in the housing, and connects between a circulating liquid discharge port for connecting a supply passage for supplying the circulating liquid after the temperature control by the heater and the heat exchanger with the load, and the tank unit, a third temperature sensor for measuring the temperature of the circulating liquid stored in the tank unit is located on the discharge passage, and the controller is configured to input the temperature of the circulating liquid measured at the third temperature sensor to detect an abnormal temperature of the circulating liquid based on the measured temperature of the circulating liquid.

5. A temperature adjustment device to adjust a temperature of a load to a target temperature, the temperature adjustment device comprising is formed by locating, inside of a housing and:

a circulating liquid circuit configured to cyclically deliver, to the load, circulating liquid returned from the load after heat exchange with the load;

a heater located in the circulating liquid circuit and configured to heat the circulating liquid in the circulating liquid circuit;

a heat exchanger connected to a heat-dissipating water circuit, the heat exchanger located in the circulating liquid circuit and configured to cool the circulating liquid in the circulating liquid circuit; and a controller configured to control an output of the heater and an output of the heat exchanger, the controller configured to input a measured temperature of the circulating liquid heated and cooled or to be heated and cooled, input a target set temperature of the circulating liquid that corresponds to the target temperature and a target reach time period for the temperature of the circulating liquid to reach the target set temperature from start of temperature adjustment, calculate, based on an initial set temperature at the start of temperature adjustment as well as the target set temperature and the target reach time period, a target temperature gradient to the target set temperature, and control the output of the heater and the output of the heat exchanger such that the measured temperature of the circulating liquid changes along the target temperature gradient, wherein the circulating liquid circuit includes a return passage through which the circulating liquid returned from the load is received, a discharge passage through which the circulating liquid subjected to temperature adjustment by the heater and the heat exchanger is delivered to the load, a tank unit connected to the return passage and the discharge passage and configured to store the circulating liquid, and a circulation pump configured to deliver the circulating liquid in the tank unit to the discharge passage, the return passage is opened in the housing, and connects between a circulating liquid return port for connecting a return passage for returning the circulating liquid after heat exchange with the load, and the tank unit, and the heat exchanger is located on the return passage, the heater is located on the tank unit, a second temperature sensor for measuring a temperature of the circulating liquid cooled in the heat exchanger is located on a downstream side of the heat exchanger in the return passage, and the controller is configured to input the temperature of the circulating liquid measured at the second temperature sensor to detect an abnormal temperature of the circulating liquid based on the measured temperature of the circulating liquid.

6. The temperature adjustment device according to claim 5, wherein the controller calculates a time-dependent set temperature of the circulating liquid from the target temperature gradient at each of a plurality of timings within the target reach time period and compares the time-dependent set temperature with the measured temperature of the circulating liquid, and the controller controls, based on a result of comparison between the time-dependent set temperature and the measured temperature, the output of the heater and the output of the heat exchanger.

7. The temperature adjustment device according to claim 5, wherein the discharge passage is opened in the housing, and connects between a circulating liquid discharge port for connecting a supply passage for supplying the circulating liquid after temperature control by the heater and the heat exchanger with the load, and the tank unit, a third temperature sensor for measuring the temperature of the circulating liquid stored in the tank unit is located on the discharge passage, and the controller is configured to input the temperature of the circulating liquid measured at the third temperature sensor to detect an abnormal temperature of the circulating liquid based on the measured temperature of the circulating liquid.

* * * * *